United States Patent [19]

Tasaki et al.

[11] Patent Number: 5,200,276
[45] Date of Patent: Apr. 6, 1993

[54] COLOR-COATED ARTICLE AND METHOD FOR PRODUCING THE SAME

[75] Inventors: Hiroshi Tasaki; Eiji Nishimura, both of Saitama; Yasunori Yamamoto, Kanagawa, all of Japan

[73] Assignee: Nippon Mining & Metals Co., Limited, Tokyo, Japan

[21] Appl. No.: 914,013

[22] Filed: Jul. 15, 1992

Related U.S. Application Data

[63] Continuation of Ser. No. 595,515, Oct. 11, 1990, abandoned.

[30] Foreign Application Priority Data

Oct. 18, 1989 [JP] Japan .................................. 1-269047
May 17, 1990 [JP] Japan .................................. 2-125486
May 23, 1990 [JP] Japan .................................. 2-131207

[51] Int. Cl.$^5$ .......................................... B32B 15/04
[52] U.S. Cl. ..................................... 428/629; 428/632; 428/659
[58] Field of Search ............... 428/629, 632, 659, 934, 428/935, 936

[56] References Cited

U.S. PATENT DOCUMENTS 3,630,792 12/1971 Smyth et al. ..................... 428/629
4,059,711 11/1977 Mino et al. ....................... 428/659
4,659,631  4/1987 Kurimoto et al. ................ 428/659

OTHER PUBLICATIONS

Color Image Dictionary, p. 186, Kodansha, May 1989.
Lynch, Richard F., "Hot-Dip Galvanizing Alloys", *Journal of Metals*, Aug. 1987, pp. 39–41.

Primary Examiner—George Wyszomierski
Attorney, Agent, or Firm—Armstrong, Westerman, Hattori, McLeland & Naughton

[57] ABSTRACT

A brown coated article which exhibits stable color is provided by the composition and structure of a zinc hot-dip galvanizing layer. The zinc hot-dip galvanizing layer consists essentially of from 1 to 15% by weight of Fe and from 0.05 to 1% by weight of Mn, and balance of Zn. A brown Zn-Mn-Fe oxide layer is present on the surface of the zinc hot-dip galvanizing layer.

4 Claims, 1 Drawing Sheet

ζ PHASE
δ₁ PHASE
IRON SUBSTRATE

Mn OXIDE
δ₁ PHASE
IRON SUBSTRATE

COLOR-COATED ARTICLE AND METHOD FOR PRODUCING THE SAME

This application is a continuation of application Ser. No. 595,515 filed Oct. 11, 1990, now abandoned.

BACKGROUND OF THE INVENTION

1. Field of Invention

The present invention relates to a color coated-article and method for producing the same. More particularly, the present invention relates to a color coated-article, in which a zinc hot-dip galvanizing layer is developed to produce the color brown, as well as to a method for producing the same.

2. Description of Related Art

It is known heretofore that color can be developed using the method of color interference. In this method, zinc hot-dip galvanizing is carried out in a plating bath with additives of approximately 0.5% by weight of Mn and/or Ti, and, then, the plating layer is oxidized to form an oxide layer of Ti and/or Mn. This method involves, however, a drawback in that the color is not maintained for a long period, and, further, the shades of brown are not formed because the color development is due to interference. In such a construction as a steel tower, a brown appearance is sometimes desired, since it harmonizes with the surroundings and environment. When the color initially developed on, for example, a steel tower, is stably maintained, an observer does not have the impression that the color has faded. Since a spotted appearance is not given, the stability of color is desirable from the point of view of aesthetics.

SUMMARY OF THE INVENTION

It is an object of the present invention to provide a zinc plated article, which exhibits a brown color and whose brown color is stably maintained.

It is also an object of the present invention to provide a zinc hot-dip galvanized article to be subjected to a brown-color development, which article is neither subject to peeling of the zinc plating layer from a steel substrate during the plating and subsequent steps, nor cracking of the plating layer.

It is a further object of the present invention to provide a method for producing the zinc-plated article mentioned above.

In accordance with the objects of the present invention, there is provided a brown coated article which consists of an iron substrate, a zinc hot-dip galvanizing layer consisting essentially of from 1 to 15% by weight of Fe and from 0.05 to 1% by weight of Mn, and the balance of Zn, and a brown Zn-Mn-Fe oxide layer which is present on the top surface of the zinc hot-dip galvanizing layer.

According to the present invention, the desired brown color is developed by means of oxidizing the surface of the zinc hot-dip galvanizing layer containing the above mentioned content of Fe and Mn. The brown color herein is the one indicated by 54/DK, 5YR/Dk and 5Gy/Dk of Hue and Tone Graph ("Color Image Dictionary" published by Kodansha on May 20, 1989, page 186). This brown color is not developed by the conventional, zinc hot-dip galvanizing layer exhibiting the interference color, but is the color of the Zn-Mn-Fe oxide per se. The above mentioned content of Fe and Mn is desirable for weather resistance, since the brown color does not fade easily when the coating article is exposed to weather.

The zinc hot-dip galvanized article to be subjected to the preparation of the brown coated article, hereinafter referred to as the intermediate article, according to the present invention, is characterized in that:

(1) it consists of an iron substrate and a zinc hot-dip galvanizing layer which comprises at its top surface an $\eta$ phase and a $\zeta$ phase below the $\eta$ phase; or (2) it consists of an iron substrate and a zinc hot-dip galvanizing layer which comprises at its top surface a Mn-oxide phase and a $\zeta$ phase below the Mn-oxide phase.

The common feature of these intermediate articles resides in that a $\delta_1$ phase which causes the peeling and crack mentioned above is absent in the top surface of the zinc hot-dip galvanizing layer.

The zinc hot-dip galvanizing layer of the intermediate articles preferably contains from 1 to 15% by weight of Fe and from 0.05 to 1% by weight of Mn.

DESCRIPTION OF PREFERRED EMBODIMENTS

The method for producing the brown coated article and the intermediate articles are hereinafter described.

Zinc used for the plating bath in the method according to the present invention may be distilled zinc metal, grade 1 (98.5% or more of purity), the purest zinc metal (99.995% by weight or more of purity), or electric zinc metal (99.99% by weight or more of purity). For example, the distilled zinc metal, grade 1, mentioned above contains 1.5% by weight or less of Pb, 0.1% by weight or less of Cd, and 0.02% by weight or less or Fe as the impurities. When it is desirable to intentionally exclude Pb and/or Cd, zinc metal containing 0.005% by weight or less of these elements should be used. When it is desirable to exclude impurities as much as possible, the purest zinc metal or electric zinc having 0.01% by weight or less of the total contents of the impurities should be used.

The plating is carried out using the bath of molten zinc with the additive of from 0.05 to 1.0% by weight of Mn. The Mn in an amount of from 0.05 to 1.0% by weight is necessary for developing the brown color in the succeeding oxidizing treatment. It is not necessary to add Fe to the molten zinc bath, because Fe is fed to the zinc hot-dip galvanizing layer from the steel substrate. A part of from 1 to 15% by weight of Fe may however be present in the molten zinc bath.

In order to carry out the hot-dip galvanizing, an iron object is dipped in the above mentioned plating bath at a temperature of from 430° to 600° C., preferably from 430° to 480° C., for at least 1 minute. On the surface of this plated iron substrate, a Mn-oxide phase is present. Beneath this phase, a Zn-Mn phase is present. Further beneath, a Zn-Mn-Fe phase is present and extends to the steel substrate. Thus, a multi-layer structure consisting of these phases is provided. The Mn-oxide phase, which is present on the top part of the multi-layer structure, does not exhibit the brown color.

According to one of the methods for developing a brown color, the Mn-oxide phase and the Zn-Mn phase are removed mechanically, e.g., by grinding, or chemically, e.g., by etching, so as to expose the Zn-Mn-Fe phase, which is then oxidized.

According to another method for developing a brown color, the Zn-Mn phase is totally converted to the Zn-Mn-Fe phase by means of heating after the plating. The Zn-Mn-Fe phase is then oxidized. Heating is desirably carried out at a temperature of from 440° to 600° C. for from 30 seconds to less than 100 minutes. This heating only leads to the development of greenish brown. However, when the coated article, in which the top layer is the Mn-oxide phase and the underlying layer is the Zn-Mn-Fe phase by the moisture in the air and by rain, and then the surface of the Zn-Mn-Fe phase is oxidized, thereby developing a brown color after one or two months. The treatment by this method, however, takes too long.

According to another method for developing a brown color, the plated and then heated pieces are dipped in an acidic solution containing an oxidizing agent. In this solution, the Mn-oxide phase is dissolved and the surface of the Zn-Mn-Fe alloy phase is oxidized. The oxidizing agent herein may by any capable of oxidizing the Zn-Mn-Fe alloy. $H_2O_2$, $O_2$, $KMnO_4$, $K_2Cr_2O_7$, and $NaNO_2$ are preferred as the oxidizing agent, especially $KMnO_4$ and $K_2Cr_2O_7$. The acid may be any capable of dissolving the Mn oxide. Mineral acid is preferred, of which $H_2SO_4$, HCl, and $HNO_3$ are especially preferred. pH of the acidic solution may be such that the Mn-oxide is dissolved, but the Zn-Mn-Fe alloy is not dissolved drastically, and, further, the oxidation effect of the oxidizing agent is not impeded essentially. The pH level is preferably from 1 to 3. Below pH 1, the Zn-Mn-Fe alloy is considerably dissolved. Above pH 3, a long time is required for the color development.

A brown color is developed by means of immersing the object under preferred conditions, for from several tens of seconds to several minutes.

The zinc hot-dip galvanizing layer formed by using the Mn-containing plating bath may peel from the iron substrate during cooling after the zinc hot-dip galvanizing, or may crack during the post-plating heating step. This problem is associated with the fact that, when the zinc hot-dip galvanizing layer contains Mn, Mn promotes the alloying of Fe and Zn and hence facilitates formation of $\delta_1$ phase ($FeZn_7$ phase) in the zinc hot-dip galvanizing layer. It turned out that the $\delta_1$ phase present in the top surface of the zinc hot-dip galvanizing layer makes the peeling and cracking of the plating layer easy to take place. In order to avoid such problems, the multi-layer structure of the intermediate article (1) mentioned above is preferred, i.e., the top layer of the zinc hot-dip galvanizing layer is $\eta$ phase, and its underlaying layer is $\zeta$ phase. The $\eta$ phase has the hexagonal structure of pure zinc, and contains in this structure 0.05–1% by weight of Mn and 0.003% by weight of Fe as the solute atoms. The balance of Mn and Fe is Zn except for the unavoidable impurities. On the other hand, $\zeta$ phase is based on the $FeZn_{12}$, in which the coloring elements, such as 0.05–1% by weight of Mn, are contained. These two phases contain less Fe than the $\delta_1$ phase. These two phases have therefore features that: they are formed by the suppression of the reaction of Fe and Zn: further, they are highly resistant to the internal stress generated in the plating layer during the post-plating cooling, and to the external stress applied to the plating layer during the post-plating heating. In order to form the $\eta$ and $\zeta$ phases, the temperature of the plating bath should be set in the preferred range mentioned above. When the temperature of the plating bath is lower than 430° C., the zinc hot-dip galvanizing becomes difficult. On the other hand, when the temperature of the plating bath is higher than 480° C., the $\zeta$ phase disappears, and the reaction between Fe and Zn is undesirably promoted by Mn under the effects of the high temperature, thereby resulting in active formation of the $\delta_1$ phase.

The generation of a crack and the phase structure of the plating layer are described with reference to FIGS. 1 and 2.

Figure 1:
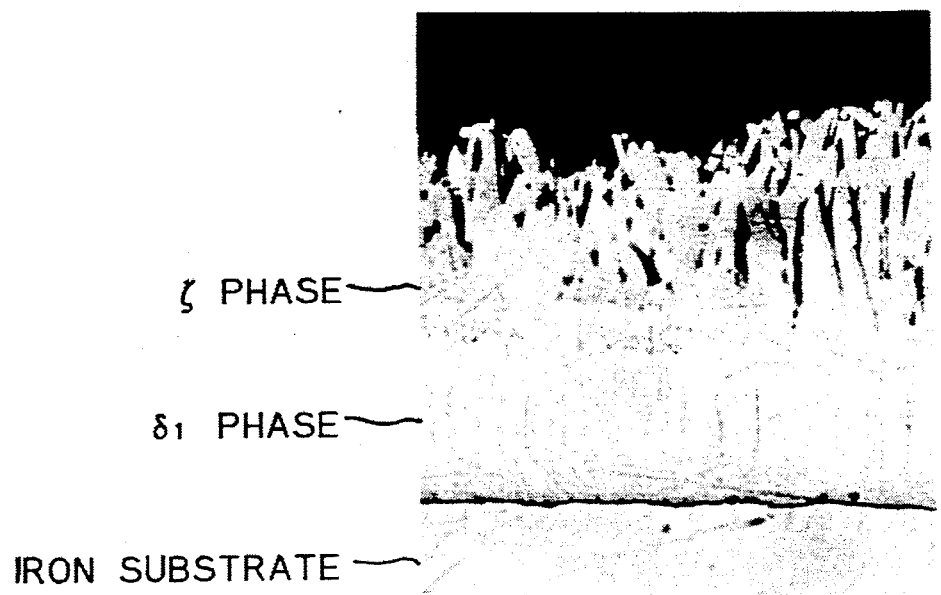
FIG. 1 is a microscope photograph (magnification 500) showing the cross sectional structure of a coating of a steel substrate, which has been zinc hot-dip galvanized in a plating bath as 480° C. for 3 minutes, and then heated at 490° C. for 6 minutes.

In the zinc hot-dip galvanizing layer shown in FIG. 1, an $\eta$ phase (top layer) and $\zeta$ phase (lower layer) were formed directly after the plating. The $\eta$ phase was decomposed, due to the heating at 490° C., into the top part mainly composed of the Mn oxide, and the underlying part which was changed to the $\zeta$ phase. The intermediate article (2) according to the present invention, was therefore provided. In this intermediate article, the $\zeta$ phase formed by the zinc hot-dip galvanizing remains, but becomes thicker, due to heating, as compared with the thickness directly after the plating. The thickness of the $\delta_1$ phase becomes greater somewhat due to the heating. The thickness change is however not prominent.

The sample treated as described above did not crack. The Mn-oxide layer of the sample tested as above was dissolved, followed by converting the $\zeta$ phase to an oxide. As a result, the desired brown color could be obtained.

Figure 2:
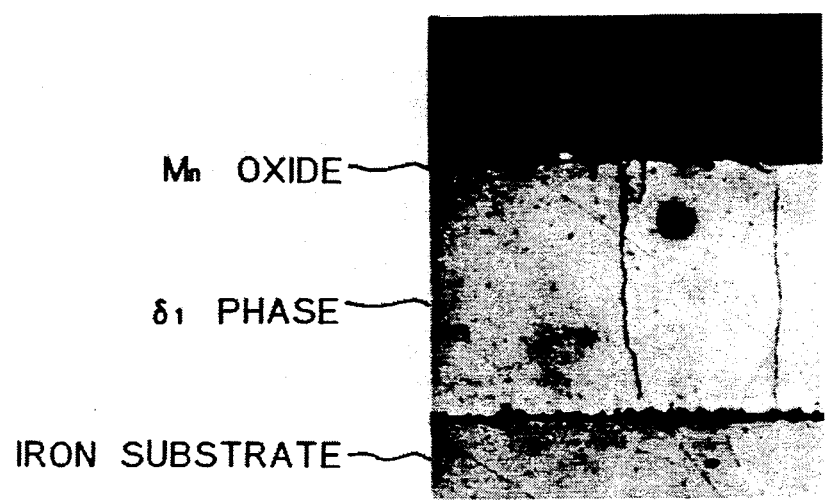
FIG. 2 is a microscope photograph (magnification 500) showing the cross sectional structure of a coating of a steel substrate, which has been zinc hot-dip galvanized in a plating bath at 540° C. for 3 minutes, and then heated at 540° C. for 10 minutes.

In the sample shown in FIG. 2, a crack was generated during the heating at 540° C. The reason for the crack generation was that the temperature of the plating bath, at 540° C., was too high. The layer-structure after heating was such that Mn-oxide constituted the surface layer, and, further, the $\delta_1$ phase was present consistantly between the surface layer and the iron substrate. This $\delta_1$ phase had a composition of Zn-Mn-Fe and developed a brown color by means of oxidizing.

The present invention is hereinafter described with reference to the examples.

EXAMPLE 1

A steel sheet (SS41) 50 mm in width, 100 mm in length, and 3.2 mm in thickness was dipped for 30 minutes in an alkaline bath having a temperature of 80° C. to degrease it. The steel sheet was then rinsed with hot water, and was then dipped for 30 minutes in a 10% hydrochloric acid solution at room temperature to descale it. Subsequently, the steel sheet was subjected to a hot water rinse and then a flux treatment using a 35% $ZnCl_2$—$NH_4Cl$ solution by dipping for 30 minutes in this solution at 60° C. The steel sheet, which was subjected to the pretreatment as described above, was dipped for 1 minute in a plating bath containing 0.5% by weight of Mn, the balance being Zn at 500° C. After the zinc hot-dip galvanizing the steel sheet was lifted above the plating bath and kept for 60 seconds in a furnace at 500° C. so as to heat-treat the steel sheet. After the heat treatment, the steel sheet was allowed to cool, and then dipped for 1 minute in a sulfuric acid solution containing 4 g/l of $KMnO_4$ and having pH of 2.

A uniform brown color corresponding to 5Y/Dk of the Hue and Tone Dictionary was formed on the surface of the zinc hot-dip galvanizing layer. The brown color developed was due to the oxide layer formed on the surface of the zinc hot-dip galvanizing layer. The composition of the coating was 0.5% by weight of Mn, 7% by weight of Fe, and the balance being Zn, directly after the zinc hot-dip galvanizing.

EXAMPLE 2

A steel sheet (SS41) 50 mm in width, 100 mm in length, and 3.2 mm in thickness was dipped for 30 minutes in an alkaline bath having a temperature of 80° C. to degrease it. The steel sheet was then rinsed with hot water and was then dipped for 30 minutes in a 10% hydrochloric acid solution at room temperature to descale it. Subsequently, the steel sheet was subjected to a hot water rinse and then a flux treatment using a 35% $ZnCl_2$—$NH_4Cl$ solution by dipping for 30 minutes in this solution at 60° C. The steel sheet, which was subjected to the pretreatment as described above, was dipped for 1 minute in a plating bath containing 0.5% by weight of Mn, the balance being Zn at 500° C. After the zinc hot-dip galvanizing, the steel sheet was lifted above the plating bath and kept for 60 seconds in a furnace at 500° C. so as to heat-treat the steel sheet. After the heat treatment, the steel sheet was allowed to cool, and then dipped for 1 minute in a sulfuric acid solution containing 4 g/l of $K_2Cr_2O_7$ and having pH of 2.

A uniform brown color corresponding to 5Y/Dk of the Hue and Tone Dictionary was formed on the surface of the zinc hot-dip galvanizing layer. The brown color developed was due to the oxide layer formed on the surface of the zinc hot-dip galvanizing layer. The composition of the coating directly after the zinc hot-dip galvanizing, was 0.5% by weight of Mn, 7% by weight of Fe, and the balance being Zn.

EXAMPLE 3

A steel sheet pretreated as in Example 1 was dipped for 3 minutes in a Zn-alloy bath containing 0.3% by weight of Mn. The temperature of the Zn-alloy plating bath was fixed at 460° C. After the zinc hot-dip galvanizing, the steel sheet was allowed to cool so as to prepare the intermediate article. The zinc hot-dip galvanizing layer of the intermediate article contained 5% by weight of Fe and 0.3% by weight of Mn. The so-treated sample, i.e., the intermediate article (1), was subjected to examination for the presence (absence) of peeling and cracks as well as examination of the layer structure. It turned out that the top layer and its underlying layer were $\eta$ phase and $\zeta$ phase, respectively. Neither peeling of the plating layer nor cracking of the plating layer was observed in the zinc hot-dip galvanizing layer after the cooling.

EXAMPLE 4

A steel sheet pretreated as in Example 1 was dipped for 3 minutes in a Zn-alloy bath containing 0.2% by weight of Mn. The temperature of the Zn-alloy plating bath was fixed at 450° C. After the zinc hot-dip galvanizing, the steel sheet was allowed to cool. Subsequently, the steel sheet was heated at 500° C. for 10 minutes and was allowed to cool. The zinc hot-dip galvanizing layer of the intermediate article contained 9% by weight of Fe and 0.2% by weight of Mn. The so-treated sample, i.e., the intermediate article (2), was subjected to examination for the presence (absence) of peeling and cracks as well as examination of the layer structure. It turned out that the top layer of the zinc hot-dip galvanizing layer was greenish brown and was mainly composed of MnO, and, further, its underlying layer was composed of $\zeta$ phase. No peeling of the plating layer was observed. By using an optical microscope at a magnification of 200, no cracking of the plating layer was observed in the zinc hot-dip galvanizing layer.

REFERENCE EXAMPLE 1

(An example for the purpose of comparing with the results of Example 3)

A steel sheet pretreated as in Example 1 was dipped for 3 minutes in a Zn-alloy bath containing 0.3% by weight of Mn. The temperature of the Zn-alloy plating bath was fixed at 500° C. After the zinc hot-dip galvanizing, the steel sheet was allowed to cool so as to prepare the intermediate article. The zinc hot-dip galvanizing layer of the intermediate article contained 8% by weight of Fe and 0.3% by weight of Mn. The so-treated sample was subjected to examination for the presence (absence) of peeling and cracks as well as examination of the layer structure. The $\eta$ and $\delta_1$ phases were observed, but the $\zeta$ phase was not observed. No cracking of the plating layer was observed in the zinc hot-dip galvanizing layer after the cooling. A brown color was difficult to develop by treatment using the acidic solution containing an oxidizing agent, as in Example 1. In addition, the brown oxide layer was easily removed by rubbing the plated layer.

EXAMPLE 5

A steel sheet (SS41) 50 mm in width, 10 mm in length, and 3.2 mm in thickness was dipped for 30 minutes in an alkaline bath having a temperature of 80° C., to degrease it. The steel sheet was then rinsed with hot water, and was then dipped for 30 minutes in a 10% hydrochloric acid solution at room temperature to descale it. Subsequently, the steel sheet was subjected to a hot water-rise and then flux treatment using a 35% $ZnCl_2$—$NH_4Cl$ solution by dipping for 30 minutes in this solution at 60° C. The steel sheet, which was subjected to the pretreatment as described above, was dipped for 1 minute in a plating bath containing 0.5% by weight of Mn, the balance being Zn at 480° C. After the zinc hot-dip galvanizing, the steel sheet was lifted above the plating bath and kept for 60 seconds in a furnace at 500° C. so as to heat-treat the steel sheet. After the heat treatment, the steel sheet was allowed to cool, and then dipped for 1 minute in a sulfuric acid solution containing 4 g/l of $K_2Cr_2O_7$ and having pH of 2.

A uniform brown color corresponding to 5Y/Dk or the Hue and Tone graph was formed on the surface of the zinc hot-dip galvanizing layer. The brown color developed was due to the oxide layer formed on the surface of the zinc hot-dip galvanizing layer. The composition of the coating directly after the zinc hot-dip galvanizing was 0.5% by weight of Mn, 6% by weight of Fe, and the balance being Zn. In the colored plating layer obtained under the above described temperature condition the $\zeta$ phase remained beneath the top layer, as contrary to that of Example 1. No cracks were therefore observed with an optical microscope at magnification of 200.

According to the present invention, the production steps and period are shorter than those of a method, in which the zinc hot-dip galvanizing, undercoat treatment, and coating with brown paint are successively carried out. In addition, according to the present invention, brown oxide having good adherance is formed, and, further, even if such oxide peels, the underlying surface is oxidized to develop the brown color. The brown color is therefore maintained for a long period of time due to the color restoration.

We claim:

1. A brown coated article which consists of an iron substrate, a zinc hot-dip galvanizing layer on said substrate consisting essentially of from 1 to 15% by weight of Fe and from 0.05 to 1% by weight of Mn, and balance of Zn, and a brown Zn-Mn-Fe oxide layer which is present as an exposed top surface on the zinc hot-dip galvanizing layer said brown color designated as one of 5Y/DK, 5YR/DK or 5GY/DK of Hue and Tone graph of the Color Image Dictionary published by Kodansha on May 20, 1989, page 186.

2. A brown coated article according to claim 1, made by the process of heating an article consisting of an iron substrate and a zinc hot-dip galvanizing layer, which layer comprises at its top surface an $\eta$ phase and a $\zeta$ phase below the $\eta$ phase, thereby converting the $\eta$ phase to a Mn-oxide phase.

3. A brown coated article according to claim 2, wherein the hot-dip galvanizing layer has been applied by immersing said iron substrate, at a temperature of from 430° to 600° C., in a molten Zn plating bath containing from 0.05 to 1% by weight of Mn, and, further, said heating is carried out for from 30 second to less than 100 minutes.

4. A brown coated article according to claim 2, wherein said brown color has been brought out by contacting the Mn oxide phase with an acidic solution containing oxidizing agent to dissolve said Mn oxide phase, and to oxidize the $\zeta$ phase.

* * * * *